United States Patent
Hwang et al.

(10) Patent No.: US 8,927,673 B2
(45) Date of Patent: Jan. 6, 2015

(54) METHOD FOR PREPARING A POLYSILSESQUIOXANE OF A CONTROLLED STRUCTURE AND POLYSILSESQUIOXANE PREPARED BY THE SAME

(75) Inventors: Seung Sang Hwang, Seoul (KR); Soon Man Hong, Seoul (KR); Soon Jong Kwak, Seoul (KR); Kyung Youl Baek, Seoul (KR); Chong Min Koo, Gyeonggi-do (KR); Seung Sock Choi, Seoul (KR); Albert S. Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/817,279

(22) PCT Filed: Sep. 14, 2010

(86) PCT No.: PCT/KR2010/006279
§ 371 (c)(1),
(2), (4) Date: Feb. 15, 2013

(87) PCT Pub. No.: WO2012/023652
PCT Pub. Date: Feb. 23, 2012

(65) Prior Publication Data
US 2013/0144025 A1 Jun. 6, 2013

(30) Foreign Application Priority Data
Aug. 18, 2010 (KR) .................. 10-2010-0079633

(51) Int. Cl.
*C08G 77/08* (2006.01)
*C08G 77/06* (2006.01)

(52) U.S. Cl.
CPC ............... *C08G 77/08* (2013.01); *C08G 77/06* (2013.01)
USPC ........................................................ 528/14

(58) Field of Classification Search
CPC ................................ C08G 77/06; C08G 77/08
See application file for complete search history.

(56) References Cited

U.S. PATENT DOCUMENTS

| | | | | |
|---|---|---|---|---|
| 3,162,614 A | * | 12/1964 | Katchman | 528/14 |
| 3,294,738 A | * | 12/1966 | Krantz | 528/21 |
| 4,399,266 A | * | 8/1983 | Matsumura et al. | 528/10 |
| 4,600,685 A | * | 7/1986 | Kitakohji et al. | 430/313 |
| 4,670,299 A | * | 6/1987 | Fukuyama et al. | 427/99.3 |
| 5,030,699 A | * | 7/1991 | Motoyama et al. | 525/477 |
| 5,039,771 A | * | 8/1991 | Morimoto et al. | 528/14 |
| 5,081,202 A | * | 1/1992 | Adachi et al. | 528/43 |

(Continued)

FOREIGN PATENT DOCUMENTS

| | | |
|---|---|---|
| JP | 2003-510337 A | 3/2003 |
| JP | 2004-002663 A | 1/2004 |
| JP | 2004-354417 A | 12/2004 |
| WO | 01/10871 A1 | 2/2001 |

OTHER PUBLICATIONS

Mabry et al. "Fluorinated Polyhedran Oligomeric Silsesquioxanes (F-POSS)" Angew. Chem. Int. Ed. 2008, 47, 4137-4140.*

(Continued)

*Primary Examiner* — Robert S Loewe
(74) *Attorney, Agent, or Firm* — Ladas & Parry LLP

(57) ABSTRACT

Disclosed are a method for polymerizing polysilsesquioxane from a trialkoxysiloxane monomer, including: preparing an aqueous organic solution including a trialkoxysiloxane monomer, an organic solvent, water and a catalyst; and selectively preparing a polysilsesquioxane with a cage structure or a polysilsesquioxane with a ladder structure by adjusting the amount of the organic solvent or water in the aqueous organic solution, and a polysilsesquioxane with a cage structure or a polysilsesquioxane with a ladder structure prepared therefrom.

10 Claims, 8 Drawing Sheets

(56) References Cited

U.S. PATENT DOCUMENTS

| | | | | |
|---|---|---|---|---|
| 5,247,043 | A | * | 9/1993 | Nakashima ............... 528/14 |
| 5,262,246 | A | * | 11/1993 | Nishikawa et al. ............ 428/500 |
| 5,399,648 | A | * | 3/1995 | Yamamoto et al. ............. 528/12 |
| 5,589,562 | A | | 12/1996 | Lichtenhan et al. |
| 5,600,151 | A | * | 2/1997 | Adachi et al. ................... 257/40 |
| 5,604,380 | A | * | 2/1997 | Nishimura et al. ............ 257/758 |
| 6,340,735 | B1 | * | 1/2002 | Yagihashi ....................... 528/37 |
| 6,399,733 | B1 | * | 6/2002 | Yamamoto et al. ............. 528/12 |
| 6,774,202 | B2 | * | 8/2004 | Lee ............... 528/33 |
| 6,787,625 | B2 | * | 9/2004 | Lee ............... 528/33 |
| 6,972,312 | B1 | * | 12/2005 | Lichtenhan et al. ............ 528/14 |
| 7,056,989 | B2 | * | 6/2006 | Hwang et al. ................. 525/474 |
| 7,598,307 | B2 | * | 10/2009 | Kuehnle et al. ................ 524/261 |
| 2006/0009604 | A1 | * | 1/2006 | Jost et al. ........................ 528/33 |
| 2006/0194068 | A1 | | 8/2006 | Katoh et al. |
| 2010/0222503 | A1 | * | 9/2010 | Laine et al. ................... 524/588 |

OTHER PUBLICATIONS

Gnanasekaran et al. "Developments of polyhedral oligomeric silsesquioxanes (POSS), POSS nanocomposites and their applications: A review" J. Sci. Ind. Res. vol. 68, 2009, 437-464.*

Cordes et al. "Recent Developments in the Chemistry of Cubic Polyhedral Oligosilsesquioxanes" Chem. Rev. 2010, 110, 2081-2173.*

K.J.Shea, et al; "Bridged Polysilsesquioxanes. Molecular-Engineered Hybrid Organic-Inorganic Materials", Chemistry of Materials, vol. 13, Issue 10, pp. 3306-3319; Published on Web Sep. 27, 2001.

P. Santhana Gopala Krishnan, et al; "Synthesis, Characterization, and Polymerization Kinetics of Novel Ladder-Like Polysilsesquioxanes Containing Side-Chain Propyl Methacrylate Groups"", Macromolecular Chemistry and Physics, vol. 204, Issue 3, pp. 531-539, first published online: Mar. 13, 2003.

Libor Matĕjka, et al; "Cage-like structure formation during sol-gel polymerization of glycidyloxypropyltrimethoxysilane", Journal of Non-Crystalline Solids, vol. 270, Issues 1-3, May 11, 2000 pp. 34-47.

M. Ronchi, et al; "Fluoride catalyzed rearrangements of polysilsesquioxanes, mixed Me, vinyl $T_8$, Me, vinyl $T_{10}$ and $T_{12}$ cages", Applied Organometallic Chemistry, vol. 24, pp. 551-557, Published online Dec. 3, 2009.

International Search Report; mailed Sep. 29, 2011; PCT/KR2010/006279.

* cited by examiner

Example 1

Example 13

Examples 15 and 16

Example 1

Example 13

Examples 15 and 16

Example 1 wavenumber(cm⁻¹)

Example 13 wavenumber(cm⁻¹)

Examples 15 and 16 wavenumber(cm⁻¹)

Example 1

Example 13

Examples 15 and 16

Example 1

Example 13

Examples 15 and 16

METHOD FOR PREPARING A POLYSILSESQUIOXANE OF A CONTROLLED STRUCTURE AND POLYSILSESQUIOXANE PREPARED BY THE SAME

TECHNICAL FIELD

The present disclosure relates to a method for preparing a polysilsesquioxane with a selectively controlled structure and a polysilsesquioxane prepared therefrom. Specifically, the disclosure relates to a method for preparing a polysilsesquioxane with a regular structure in pure form by controlling a polymerization condition and a polysilsesquioxane prepared therefrom.

BACKGROUND ART

Researches on new polymer materials are carried out in order to confer improved functionalities, including thermal, mechanical and electrical properties. In this regard, development of new hybrid materials consisting of organic and inorganic components is drawing attentions.

The most important considerations in the designing of organic/inorganic hybrid materials meeting such technical requirements are compatibility between organic and inorganic polymers, thermal stability, or the like. Polysilsesquioxane with high heat resistance is viewed as a solution material that can solve the technical requirements. With superior physical and chemical properties, polysilsesquioxane materials are widely used in the form of oil, rubber, resin, etc. for heat-resistant, weather-resistant and impact-resistant packages, seals, insulations, lubrication, semi-gas permeable coatings, or the like. They are extremely important polymers in the industries.

However, it has not been commercialized on a large scale since the structure of polysilsesquioxane is not fully elucidated and the control of molecular weight is difficult.

In general, polysilsesquioxane is synthesized by hydrolysis hydrolysis polymerization. At present, hydrolysis polymerization using trialkoxysilane ($RSi(OR)_3$) or trichlorosilane ($RSiCl_3$) is widely known. Formerly, it was thought that thus synthesized polysilsesquioxane generally has a perfect ladder structure. However, with the development in chemical analysis technique, it is known that it has an imperfect cage structure or a low molecular weight, irregular structure with a weight average molecular weight 5,000 or smaller.

For these reasons, the expected solubility and mechanical or physical properties are not attained. Since the synthesis of polysilsesquioxane with a perfect ladder structure having superior solubility in general organic solvents is very difficult, organic/inorganic hybridization of polysilsesquioxane is mainly performed by the sol-gel method. A lot of experimental data are presented to overcome these problems.

As an existing art, a method of converting incompletely condensed silsesquioxane, which results from a general condensation reaction, into one having a cage structure in the presence of an excess base catalyst is reported. However, this method is not practically applicable since a complete cage structure or ladder structure is not attained. In particular, there are few cases of reported application for monomers having bulky side chains (Patent Reference 1: Japanese Patent Laid-Open No. 2003-510337).

Further, as an existing method for preparing silsesquioxane, a method of performing condensation at high temperature for long hours in the presence of a base catalyst is known. However, the reaction at high temperature for long hours consumes a lot of energy and, although the degree of condensation is relatively high, it is still insufficient (The alkoxy groups remain.) (Patent Reference 2: Japanese Patent Laid-Open No. 2004-354417).

Two-stage condensation was proposed to overcome the problems of the above methods. It aims at preparing silsesquioxane with higher T3 structure ratio through a two-stage reaction of polymerization followed by dehydration at high temperature. However, the complicated process is not readily applicable to the industrial fields (Patent Reference 3: Japanese Patent Laid-Open No. 2004-002663).

Besides, copolymers obtained from silsesquioxane derivatives are reported in several literatures. They aim at crosslinking silsesquioxane having an imperfect cage structure with a difunctional siloxane compound. However, the resulting polysilsesquioxane is not structurally perfect (Patent Reference 4: U.S. Pat. No. 5,589,562).

As described, the researches on silsesquioxane thus far have not succeeded in obtaining a polymer with a perfect structure. Merely, polymerization techniques for attaining particular structures such as ladder structure or cage structure are being studied.

DISCLOSURE OF INVENTION

Technical Problem

The inventors have noted that the existing polysilsesquioxane polymers prepared by the sol-gel method are restricted a lot in physical properties and applications because they are mixtures of polyhedral silsesquioxane (POSS) with a cage structure, ladder type polysilsesquioxane (LPSQ) with a ladder structure and a polymer with an irregular structure, and have focused on enabling a selective synthesis of polysilsesquioxane with a highly regular structure, such as the POSS with a cage structure or the LPSQ with a ladder structure, via a simple process.

The present disclosure is directed to providing a method for preparing a polysilsesquioxane in a simpler and more environment-friendly manner, and a high-molecular-weight polysilsesquioxane with a highly regular cage structure or ladder structure using the preparation method.

The present disclosure is also directed to providing a method for allowing commercialization of a polysilsesquioxane material with superior physical and chemical stability.

Solution to Problem

In one general aspect, there is provided a method for polymerizing a polysilsesquioxane from a monomer represented by Chemical Formula 1, including: preparing an aqueous organic solution including the monomer represented by Chemical Formula 1, an organic solvent, water and a catalyst; and selectively polymerizing a polysilsesquioxane with a cage structure represented by Chemical Formula 2 or a polysilsesquioxane with a ladder structure represented by Chemical Formula 3 by adjusting the amount of the organic solvent or water in the aqueous organic solution:

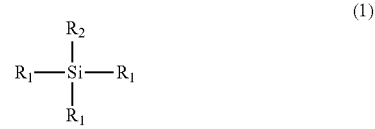

(1)

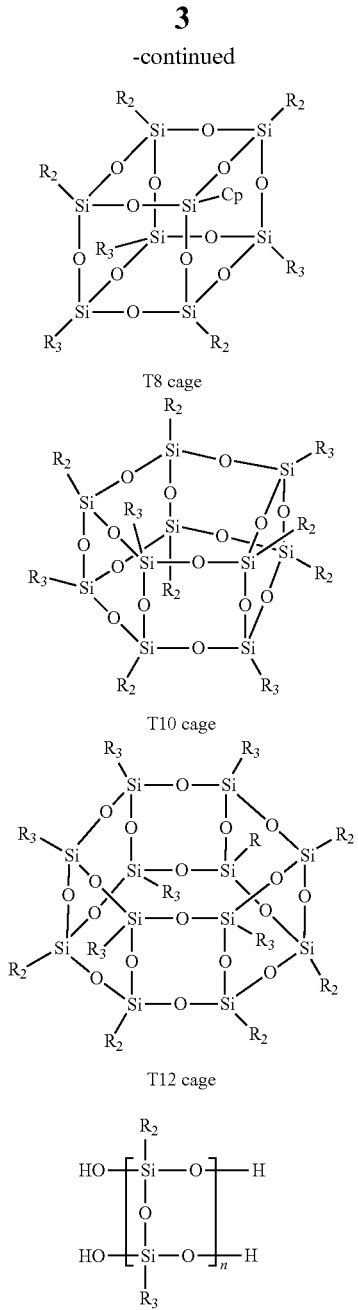

(2)

T8 cage

T10 cage

T12 cage (3)

wherein $R_1$ is $C_1$-$C_{20}$ alkoxy; $R_2$ and $R_3$ are independently a substituted or unsubstituted aliphatic organic functional group or alkyl, aryl, vinyl, amine, acryl, halogen or alkylhalogen, wherein $R_2$ and $R_3$ may be the same or different; and n is from 2 to 100,000.

In another general aspect, there is provided a polysilsesquioxane with a closed cage structure or a high-molecular-weight polysilsesquioxane with a ladder structure prepared by the above method.

Advantageous Effects of Invention

In accordance with the present disclosure, a polysilsesquioxane with a highly regular structure can be polymerized easily at room temperature. The troubles associated with condensation polymerization, i.e. transfer between reactors for 2 to 3 times during the polymerization, dehydration and control of molecular weight at high temperature may be avoided.

Further, the product can be easily separated from the aqueous layer and the organic layer without a complicated purification process. As a result, a pure polysilsesquioxane with a cage structure or a ladder structure can be polymerized very economically and effectively with high yield.

In addition, the safety problem associated with polymerization at high temperature and the environmental problem associated with evaporation of the organic solvent are avoided. Since the organic solvent can be recycled by distillation, the disclosed method is more environment-friendly and economical than the existing methods.

Since the resulting polysilsesquioxane product having a desired controlled structure has superior processability as a polymer material as well as excellent heat resistance and special functionality as an inorganic material, it may be applicable in various industries as a novel hybrid material.

BRIEF DESCRIPTION OF DRAWINGS

The above and other aspects, features and advantages of the disclosed exemplary embodiments will be more apparent from the following detailed description taken in conjunction with the accompanying drawings in which.

BEST MODE FOR CARRYING OUT THE INVENTION

Figure 1:
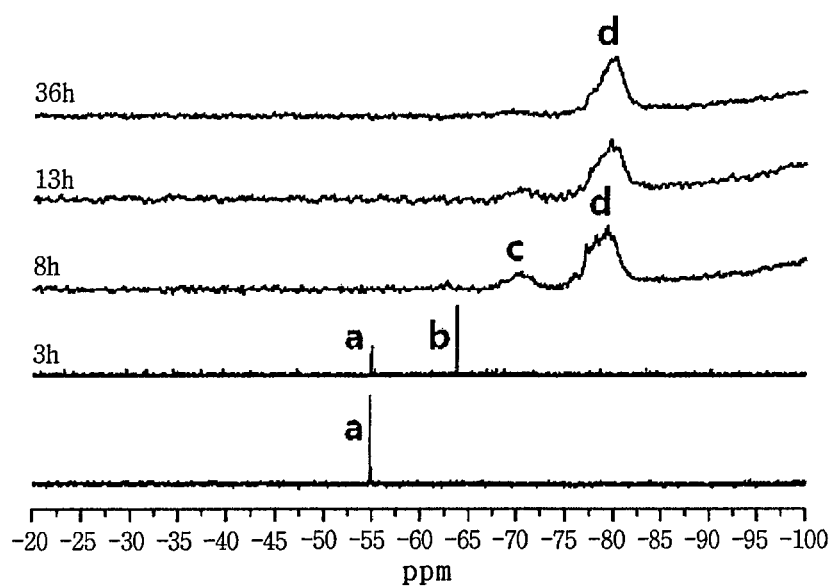
FIG. 1 shows structural growth of an intermediate monomer and a silsesquioxane with a ladder structure with time estimated by $^{29}$Si-NMR in Example 9.
Figure 1:
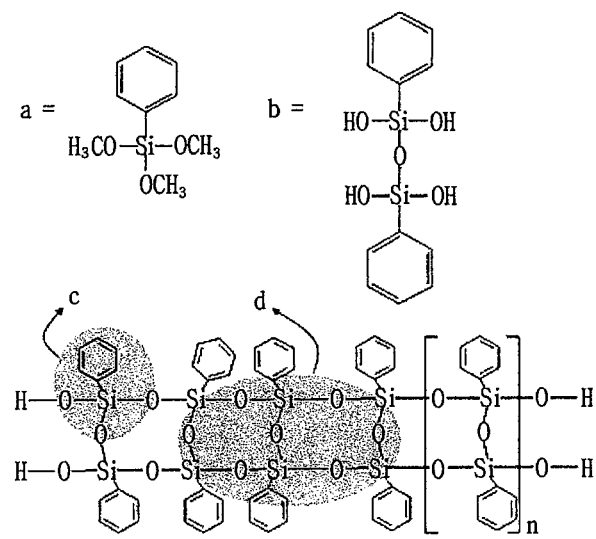

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In general, it is not easy to control the structure of a polymer polymerized from monomers having three linker groups because it prefers a network structure. When a polysilsesquioxane is prepared from a trifunctional silane monomer via a generally employed sol-gel method, a polyhedral silsesquioxnae (POSS) with a cage structure a ladder type polysilsesquioxane (LPSQ) with a ladder structure and a polysilsesquioxane with an irregular structure are obtained as mixtures. Thus, it is not easy to find a polysilsesquioxane having a highly regular structure and the stability of the prepared polymer is not fully elucidated in many cases.

To solve this problem, the present disclosure provides a method for polymerizing a polysilsesquioxane from a monomer represented by Chemical Formula 1, comprising: preparing an aqueous organic solution comprising the monomer represented by Chemical Formula 1, an organic solvent, water and a catalyst; and selectively polymerizing a polysilsesquioxane with a cage structure represented by Chemical Formula 2 or a polysilsesquioxane with a ladder structure represented by Chemical Formula 3 by adjusting the composition of the aqueous organic solution to allow continued condensation of the oligomers in a stable state:

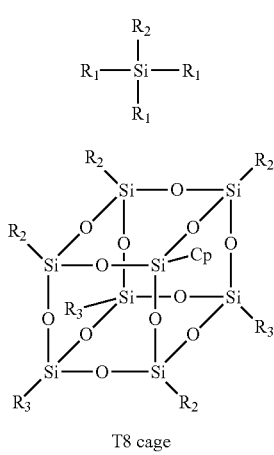

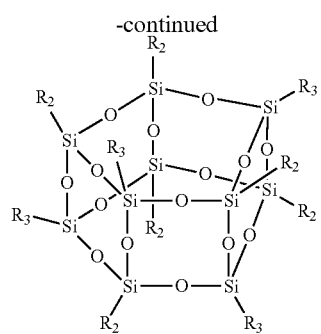

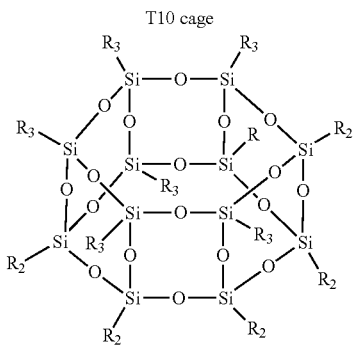

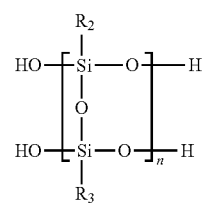

wherein $R_1$ is $C_1$-$C_{20}$ alkoxy; $R_2$ and $R_3$ are independently a substituted or unsubstituted aliphatic organic functional group or alkyl, aryl, vinyl, amine, acryl, halogen or alkylhalogen, wherein $R_2$ and $R_3$ may be the same or different; and n is from 2 to 100,000.

In accordance the present disclosure, a polysilsesquioxane with a highly regular structure can be prepared at high yield and in pure form simply by controlling the polymerization condition.

First, an aqueous organic solution comprising a monomer represented by Chemical Formula 1, an organic solvent, water and a catalyst is prepared.

In an embodiment, the monomer represented by Chemical Formula 1 may be a trifunctional silane monomer wherein $R_1$ is $C_1$-$C_{20}$ alkoxy, $R_2$ is a substituted or unsubstituted aliphatic organic functional group linked to the central Si atom via a $C_0$-$C_{20}$ carbon chain or alkyl, aryl, vinyl, amine, acryl, halogen or alkylhalogen, but is not limited thereto.

In an embodiment, in the polysilsesquioxane with a cage structure represented by Chemical Formula 2 or the polysilsesquioxane with a ladder structure represented by Chemical Formula 3, $R_2$ and $R_3$ may independently be a substituted or unsubstituted aliphatic organic functional group or alkyl, aryl, vinyl, amine, acryl, halogen or alkylhalogen, and $R_2$ and $R_3$ may be the same or different.

For example, the substituted or unsubstituted aliphatic organic functional group may be phenyl, acene or phenylene, but is not limited thereto.

The alkyl may have any number of carbons, but, specifically, it may have 0 to 20 carbon atoms, more specifically 1 to 20 carbon atoms.

The aryl may be a simple aryl group or a heteroaryl group such as porphyrinyl, phenothiazinyl, coumarinyl, etc., but is not limited thereto.

The vinyl may be a simple vinyl group or a heterovinyl group such as vinyl ester, oxodivinyl, sulfovinyl, etc., but is not limited thereto.

The amine may be present at any location in a $C_0$-$C_{20}$ carbon chain. For example, it may be imidazole, but is not limited thereto.

The acryl may be a substituted or unsubstituted acryl group. For example, it may be methacryl or acryloxy, but is not limited thereto.

The halogen or alkylhalogen may be F, Br or Cl or $C_1$-$C_{20}$, specifically $C_2$-$C_{10}$, alkyl substituted with halogen.

Through experiments, the inventors found a catalyst capable of producing a polysilsesquioxane with a regular structure at room temperature in short time. Specifically, the catalyst included in the aqueous organic solution may be an alkali catalyst. For example, the alkali catalyst may be any potassium-containing compound without particular limitation. Specifically, it may be potassium carbonate ($K_2CO_3$).

After the aqueous organic solution comprising the monomer represented by Chemical Formula 1, the organic solvent, water and the catalyst is prepared, the compound represented by Chemical Formula 1 may be hydrolyzed to give an intermediate represented by Chemical Formula 4:

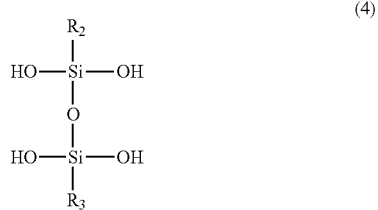

(4)

wherein $R_2$ and $R_3$ are the same as defined above.

If potassium carbonate ($K_2CO_3$) is used as the catalyst, the $K_+$ion from potassium carbonate may react with the —OH$_-$ ion which is produced as $R_1$ of the monomer represented by Chemical Formula 1 is converted to —OH.

In an embodiment, the concentration of the catalyst included in the aqueous organic solution is not particularly limited as long as the desired reaction proceeds. For example, it may be included at a concentration of 0.0001 to 50 mol % based on the molar concentration of $R_1$.

In an embodiment, the organic solvent included in the aqueous organic solution may be a polar solvent that can be mixed homogeneously with water. For example, it may be one or more selected from a group consisting of tetrahydrofuran (THF), dimethylformamide (DMF), acetonitrile, acetone, methyl ethyl ketone (MEK), methyl isobutyl ketone (MIBK), dimethyl sulfoxide (DMSO), dimethylacetamide (DMAc) and N-methylpyrrolidone (NMP), but is not limited thereto.

In accordance with the present disclosure, the amount of the organic solvent or water in the aqueous organic solution is adjusted. Through this, the oligomers may be condensed continuously in a stable state.

In an embodiment, the amount of the organic solvent may be adjusted to control the structure of the polysilsesquioxane. When the amount of the organic solvent is adjusted to 70 wt % or more or 30 wt % or less based on the entire aqueous solution, a silsesquioxane with a cage structure may be polymerized. And, when the amount of the organic solvent is adjusted to 31 to 69 wt % based on the entire aqueous solution, a polysilsesquioxane with a ladder structure may be polymerized.

In another embodiment, the amount of water may be adjusted to control the structure of the polysilsesquioxane. When the molar ratio of $R_1$:water is adjusted to 0.5 to 10, a silsesquioxane with a ladder structure may be polymerized. And, when the molar ratio of $R_1$:water is adjusted to smaller than 0.5 or larger than 10 based on the entire aqueous solution, a polysilsesquioxane with a cage structure may be polymerized.

As a specific example, the preparation of a polysilsesquioxane with a highly regular cage structure or a high-molecular-weight polysilsesquioxane with a ladder structure and the control of their structure when potassium carbonate is included in the aqueous organic solution as catalyst will be described below.

To water of an amount required to achieve the desired structure based on the total moles of the alkoxy group of an alkoxy monomer represented by Chemical Formula 1, the potassium carbonate catalyst is added in an amount of 0.0001 mol % or more based on the alkoxy groups of the alkoxy monomer represented by Chemical Formula 1. After completely dissolving, an organic solvent is added dropwise and sufficiently stirred for 10 to 30 minutes. After the three components (water, organic solvent and potassium carbonate) are completely mixed, the alkoxy monomer represented by Chemical Formula 1 is added dropwise.

The reaction may be carried out at room temperature without particular control. However, it may be carried out at 0 to 50° C. since the polymerization is not significantly affected.

Since transfer between reactors or dehydration at high temperature following condensation are not necessary, unlike a general polymerization process, and since the reaction may proceed at a temperature lower than the boiling point of the organic solvent, the reaction process is highly energy-efficient and environment-friendly.

While the reaction proceeds, the progress of reaction may be monitored with eyes based on layer separation or particle formation. When precipitation or particle formation occurs in the aqueous organic solution, the reaction may be terminated. In the aqueous organic solution, the alkoxy of the alkoxy monomer is converted to —OH and forms a dimer as shown in FIG. 1. Then, it gradually grows into a polysilsesquioxane with a highly regular structure through condensation. The resulting polysilsesquioxane is not homogeneously mixed any more with alcohols (resulting from the conversion of the alkoxy group to —OH) or water (from the aqueous solution or produced by the condensation), but forms precipitates or particles as a separated phase.

The reaction time may be 12 to 300 hours.

Figure 2:
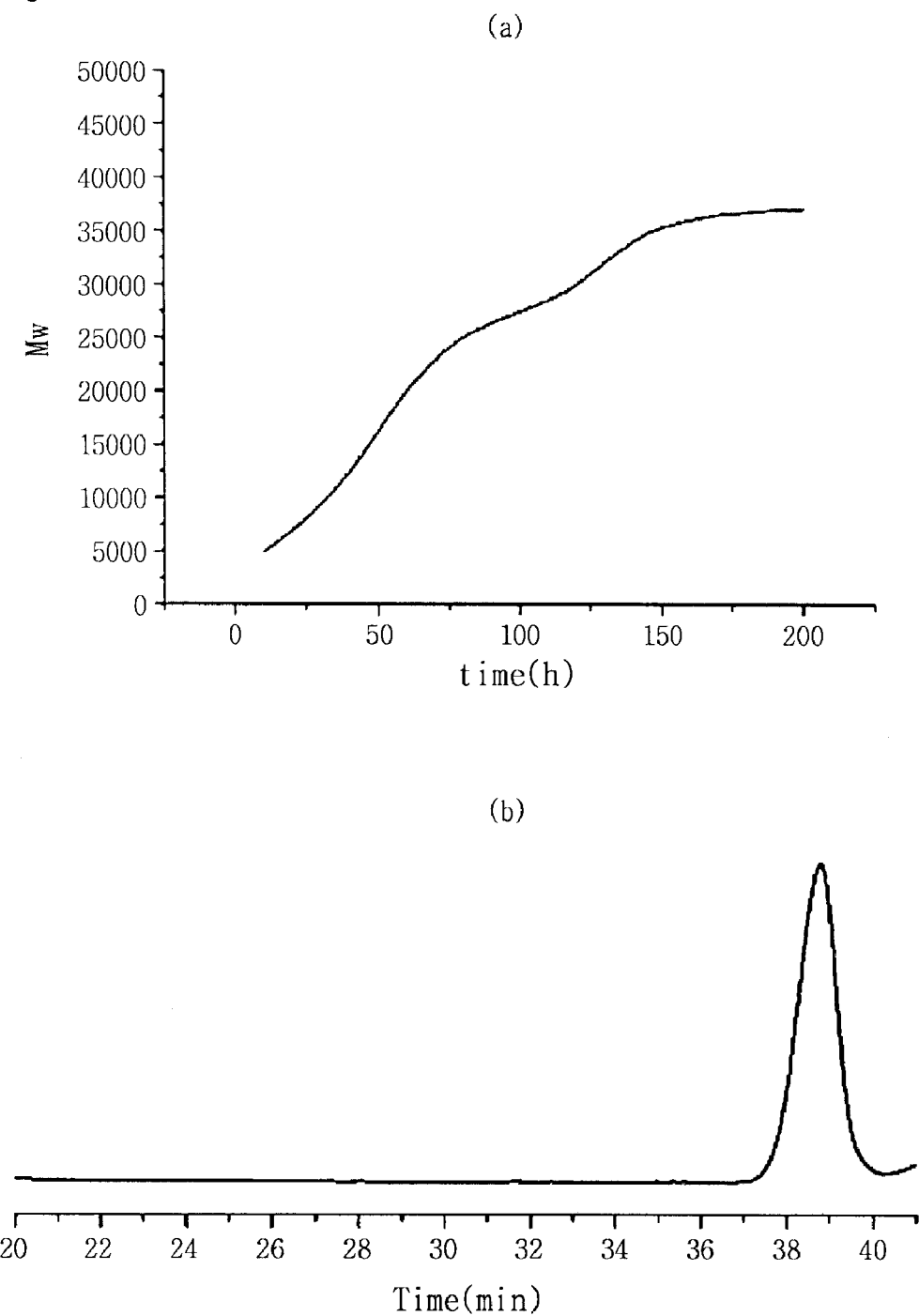
FIG. 2 shows increase of molecular weight with time of a silsesquioxane with a ladder structure and a silsesquioxane with a cage structure.

After the reaction is terminated, the completion of polymerization is confirmed by gel permeation chromatography (GPC). In case of the polymer with a ladder structure, the polymerization may be carried out until the molecular weight does not increase any more, as shown in FIG. 2 (a). In case of the silsesquioxane with a closed cage structure, the polymerization may be carried out until the degree of dispersity is maintained within 1.2 for over 10 hours with no increase in molecular weight, as shown in FIG. 2 (b).

The resulting polysilsesquioxane is purified as follows.

First, in order to separate the prepared polysilsesquioxane, the organic solvent used in the reaction is completely distilled using a rotary distiller. Then, the polysilsesquioxane and potassium carbonate remaining in the reactor may be easily separated using a separatory funnel. For this, a solvent which is immiscible with water and capable of dissolving polysilsesquioxane easily, e.g. dichloromethane, chloroform, toluene, xylene or ether may be used.

Figure 8:
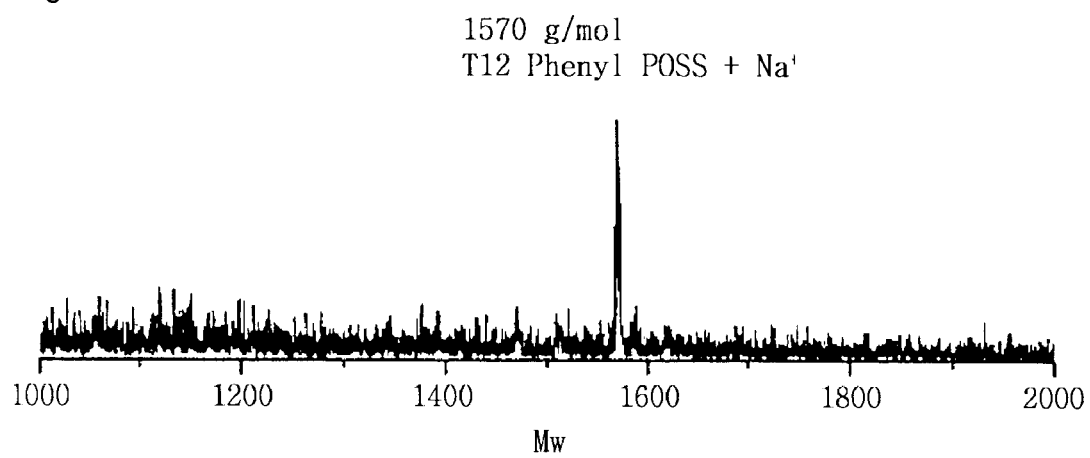
FIG. 8 shows MALDI-TOF MS analysis result of polysilsesquioxanes with a cage structure of Examples 15 and 16.

The molecular weight of thus obtained polysilsesquioxane may be determined by matrix-assisted laser desorption/ionization (MALDI)-time-of-flight (TOF) mass spectrometry (MS). The silsesquioxane with a cage structure has a molecular weight that is expected from its structure. GPC analysis reveals that the high-molecular-weight silsesquioxane with a ladder structure has a weight average molecular weight ($M_w$) of 10,000 to 400,000 (FIG. 8). Analysis of the degree of polymerization of the synthesized polysilsesquioxane by MALDI-TOF MS, thermogravimetric analysis (TGA), IR, $^1$H-NMR and $^{29}$Si—NMR reveals that the polymerization was performed completely. Further, molecular structure may be analyzed by X-ray diffraction (XRD).

Figure 6:
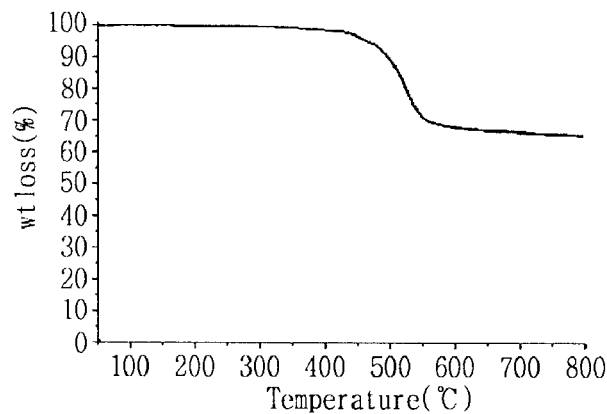
FIG. 6 shows TGA analysis result of polysilsesquioxanes with a ladder structure of Examples 1 and 13 and polysilsesquioxanes with a cage structure of Examples 15 and 16.
Figure 6:
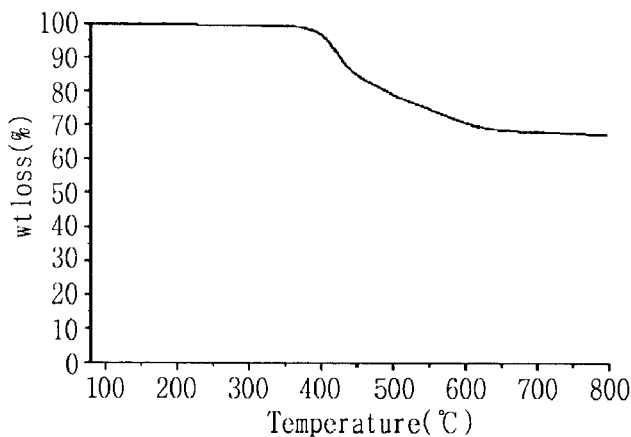
Figure 6:
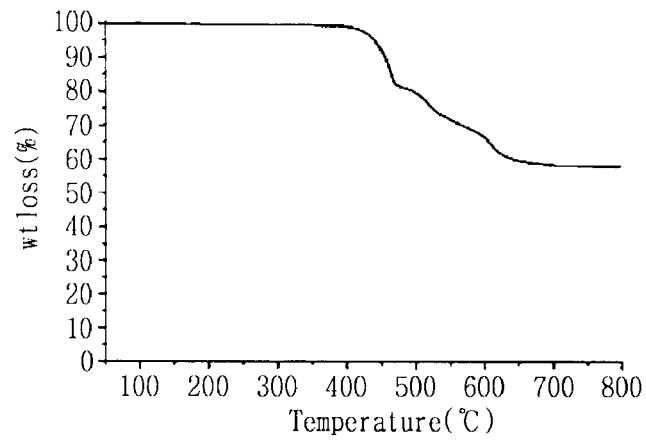

TGA analysis at a region from room temperature to 300° C., where the loss of terminal —OH and alkoxy groups resulting from incomplete polymerization can be observed, reveals a highly regular structure with no defect (FIG. 6).

Figure 5:
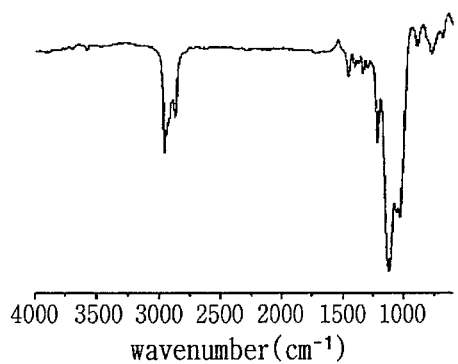
FIG. 5 shows IR analysis result of polysilsesquioxanes with a ladder structure of Examples 1 and 13 and polysilsesquioxanes with a cage structure of Examples 15 and 16.
Figure 5:
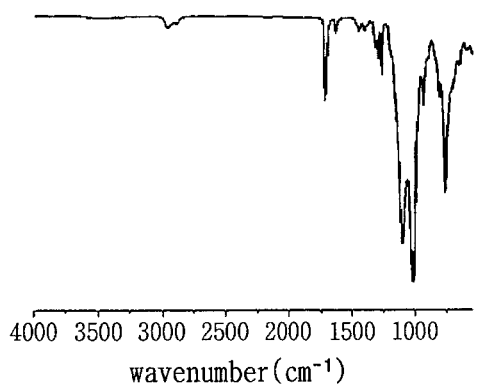
Figure 5:
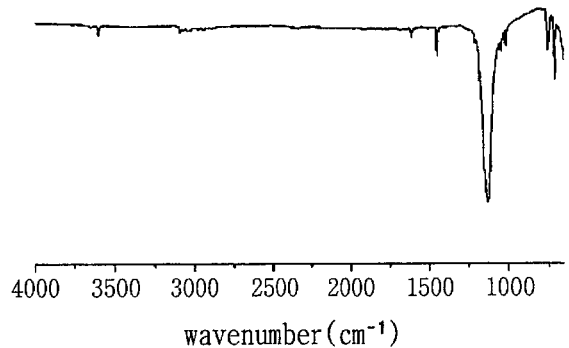

Further, IR analysis reveals a rapid decrease of Si—OH peaks found at 3000 to 3400 cm$^{-1}$ and near 900 cm$^{-1}$ with time. After the purification, the corresponding peaks are hardly seen. In contrast, the Si—O peak at 1000 to 1100 cm$^{-1}$ and the Si—O—Si peak at 1100 to 1200 cm$^{-1}$ are distinctly separated as the degree of polymerization increases (FIG. 5). The polysilsesquioxane with a cage structure having one Si—O—Si angle shows only one peak at 1000 to 1100 cm$^{-1}$. In contrast, the polysilsesquioxane with a ladder structure, which has two Si—O—Si angles in the perpendicular and horizontal directions, shows the two peaks distinctly. Thus, it can be concluded that a silsesquioxane with a highly regular closed cage structure and a high-molecular-weight polysilsesquioxane with a ladder structure were synthesized.

Figure 3:
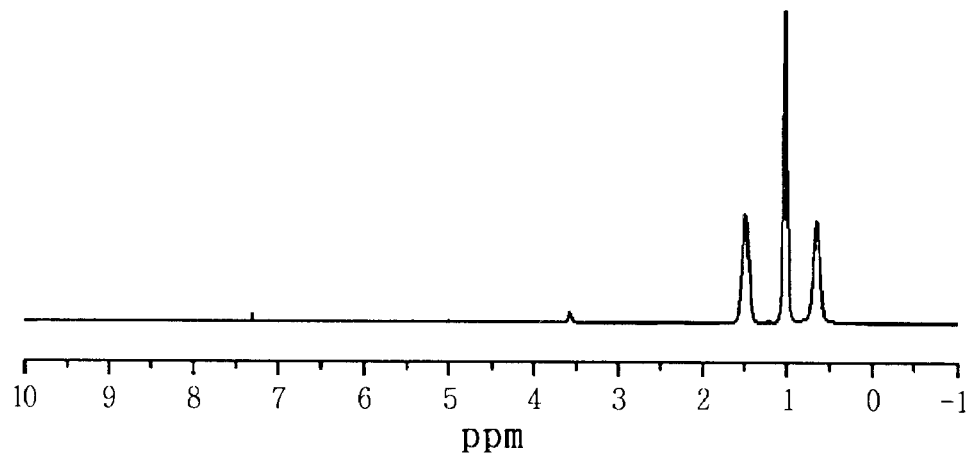
FIG. 3 shows $^1$H-NMR (CDCl$_3$) analysis result of polysilsesquioxanes with a ladder structure of Examples 1 and 13 and polysilsesquioxanes with a cage structure of Examples 15 and 16.
Figure 3:
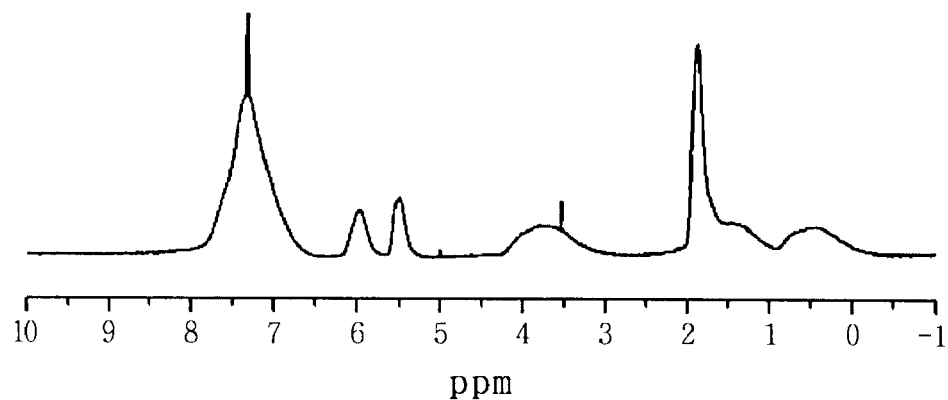
Figure 3:
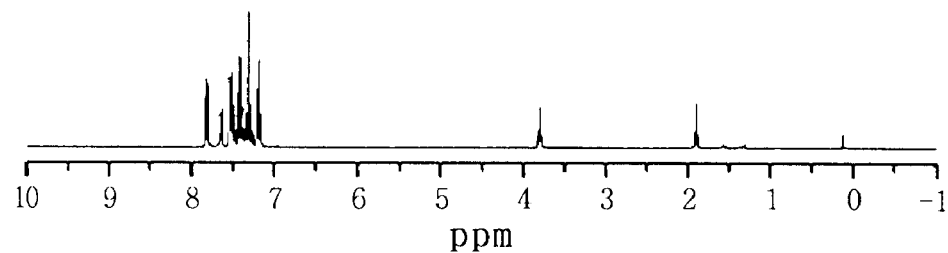
Figure 4:
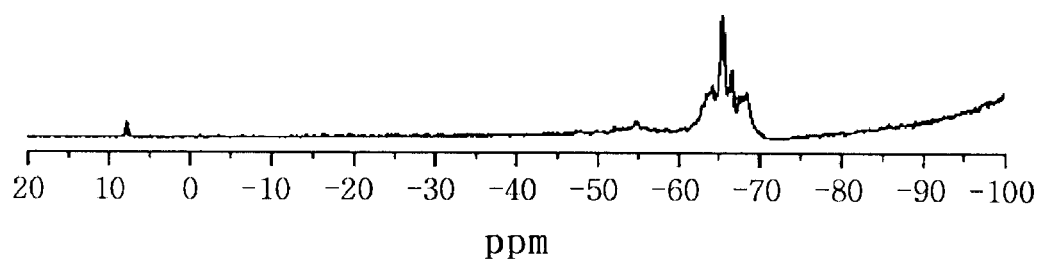
FIG. 4 shows $^{29}$Si-NMR analysis result of polysilsesquioxanes with a ladder structure of Examples 1 and 13 and polysilsesquioxanes with a cage structure of Examples 15 and 16.
Figure 4:
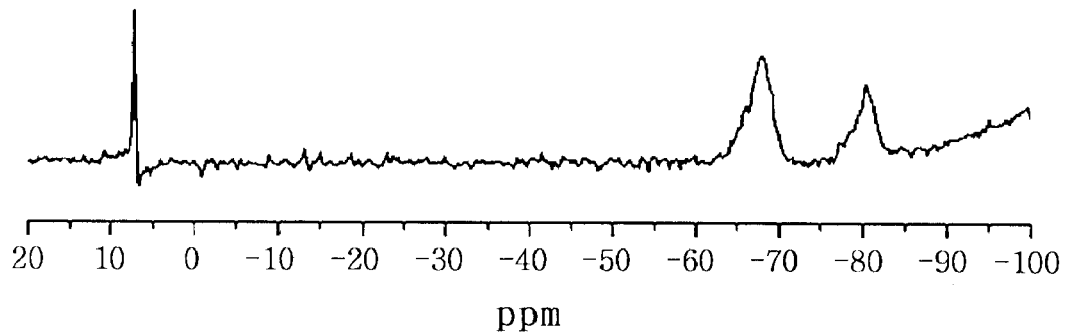
Figure 4:
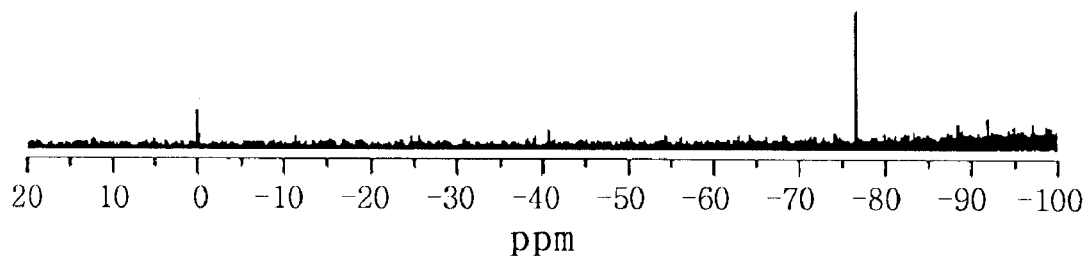

$^1$H-NMR analysis confirms that all the alkoxy moieties of the alkoxy monomer was converted to —OH and then condensed (FIG. 3). $^{29}$Si-NMR analysis reveals a perfect T3 structure of Si—O—Si with no T2 structure such as Si—OH, Si—OCH$_3$, etc. (FIG. 4). Especially, the silsesquioxane with a cage structure shows only one T3 peak.

Figure 7:
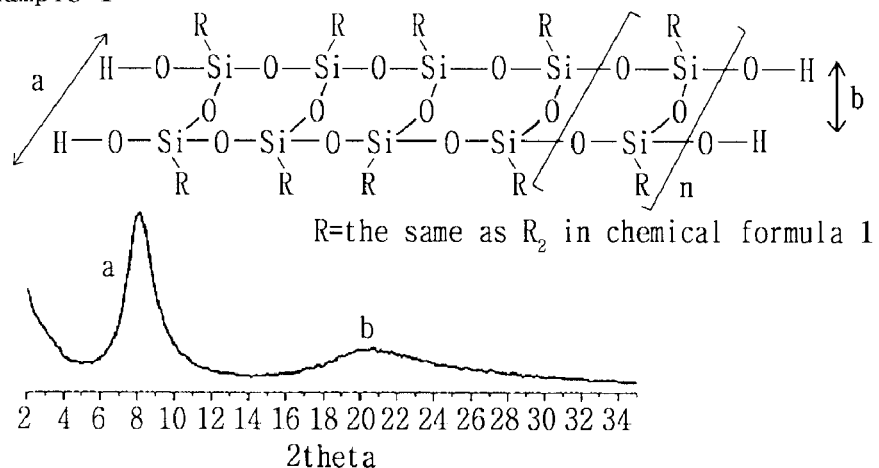
FIG. 7 shows XRD analysis result of polysilsesquioxanes with a ladder structure of Examples 1 and 13 and polysilsesquioxanes with a cage structure of Examples 15 and 16.
Figure 7:
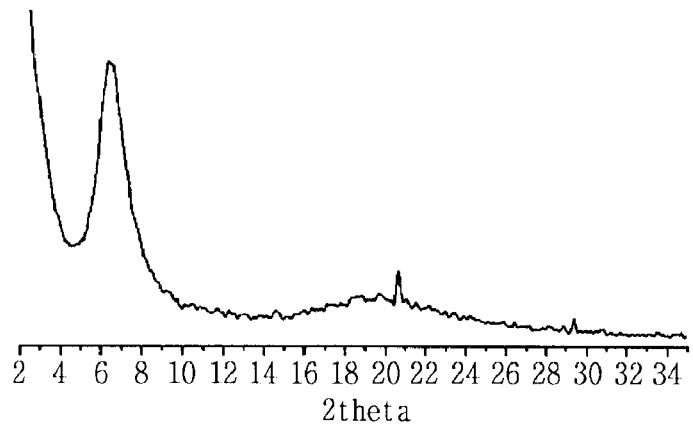
Figure 7:
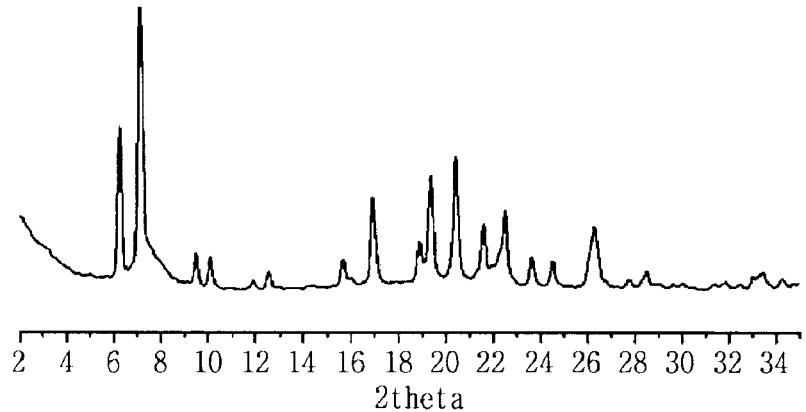

As seen from FIG. 7, analysis of XRD data reveals two distinct peaks for the silsesquioxane with a ladder structure. From the broad peak b, the length of the ladder type polymer in the longitudinal axis can be calculated. And, from the narrow peak a, the distance between the chains of the ladder type polymer can be calculated by the Bragg's equation. Also, XRD analysis confirms that the silsesquioxane with a cage structure has a strongly crystalline structure.

If the polysilsesquioxane material is polymerized using the disclosed method, the silsesquioxane may be controlled to have a cage structure or a ladder structure by adjusting the amount of water and the solvent. In addition, the problems associated with the two-stage polymerization (consisting of hydrolysis followed by condensation), i.e. dehydration, control of high temperature, etc., may be avoided.

Mode for the Invention

The examples and experiments will now be described. The following examples and experiments are for illustrative purposes only and not intended to limit the scope of the present disclosure.

Example 1

Propyltrimethoxysilane (0.4 mol) was prepared as a trialkoxy monomer and HPLC-grade tetrahydrofuran (40 g) and distilled water (24 g) were prepared as an aqueous mixture solvent. Potassium carbonate (0.2 g) was dissolved previously in distilled water as a catalyst and then mixed with tetrahydrofuran by homogeneously stirring for 20 minutes.

Propyltrimethoxysilane (0.4 mol) was added dropwise to the resulting aqueous solution and then stirred. After the addition was completed, a gradual increase in molecular weight could be monitored with the progress of reaction, as shown in FIG. 1. The reaction was terminated when GPC revealed that the molecular weight did not increase any more. This coincided with the time when a boundary between layers was clearly seen with eyes. The resulting polysilsesquioxane may be purified simply by fractional distillation using a solvent which is immiscible with water and capable of dissolving polysilsesquioxane easily, e.g. chloroform, methylene chloride, toluene, xylene, etc.

$M_w$=85,418 (based on polystyrene).
$^1$H-NMR (CDCl$_3$) δ (ppm) 0.5-0.7 (Si—CH$_2$), 0.9-1.1 (CH$_3$), 1.4-1.6 (CH$_2$).
$^{29}$Si-NMR (CDCl$_3$) δ (ppm)–61 to –73 (CH$_2$—Si(O)$_{3/2}$).

Examples 2 to 4

Polypropylsilsesquioxane was prepared in the same manner as Example 1 by varying the amount of water, the solvent and the catalyst in the aqueous organic solution. Molecular weight of the produced polypropylsilsesquioxane was measured by GPC as in Example 1. The result is given in Table 1. In Examples 2, 3 and 4, the molar ratio of water to the alkoxy group of the alkoxy monomer in the aqueous organic solution was 1.1, 2.3 and 4.6, respectively.

TABLE 1

| Ex. No. | Water content (g) | Solvent content (g) | Catalyst content (g) | Molecular weight | Dispersity $M_w/M_n$ |
|---|---|---|---|---|---|
| 2 | 48 | 80 | 0.4 | 200,278 | 24 |
| 3 | 24 | 40 | 0.4 | 431,056 | 29 |
| 4 | 100 | 0 | 10 | 10,922 | 18.8 |

(The monomer content was set at 0.4 mol.)

Example 5

Polypropylsilsesquioxane was prepared in the same manner as Example 1 by changing the reaction temperature from room temperature to 40° C. or above. Molecular weight of the produced polypropylsilsesquioxane was measured by GPC as in Example 1.

$M_w$=69,562 (based on polystyrene).
$^1$H-NMR (CDCl$_3$) δ (ppm) 0.5-0.7 (Si—CH$_2$), 0.9-1.1 (CH$_3$), 1.4-1.6 (CH$_2$).

Examples 7 and 8

Polymerization was performed in the same manner as Example 1 using 3-chloropropyltrimethoxysilane or 3-bromopropyltrimethoxysilane having a terminal halogen group as the trialkoxy monomer. GPC result is shown in Table 2.

TABLE 2

| Ex. No. | Monomer | Water content (g) | Solvent content (g) | Catalyst content (g) | Molecular weight | Dispersity $M_w/M_n$ |
|---|---|---|---|---|---|---|
| 7 | 3-Chloropropyl trimethoxy-silane | 24 | 40 | 0.2 | 28,309 | 9 |

TABLE 2-continued

| Ex. No. | Monomer | Water content (g) | Solvent content (g) | Catalyst content (g) | Molecular weight | Dispersity $M_w/M_n$ |
|---|---|---|---|---|---|---|
| 8 | 3-Bromopropyl trimethoxysilane | 24 | 40 | 0.2 | 13,280 | 6 |

Examples 9 to 12

Polymerization was performed in the same manner as Example 1 using phenyltrimethoxysilane or ethylphenyltrimethoxysilane, an alkylated phenylsilane, as the trialkoxy monomer. GPC result is shown in Table 3.

TABLE 3

| Ex. No. | Monomer | Water content (g) | Solvent content (g) | Catalyst content (g) | Molecular weight | Dispersity $M_w/M_n$ |
|---|---|---|---|---|---|---|
| 9 | Phenyltrimethoxysilane | 24 | 40 | 0.2 | 10,944 | 8.5 |
| 10 | Phenyltrimethoxysilane | 24 | 200 | 0.2 | 1,600 | 2.1 |
| 11 | Phenyltrimethoxysilane | 100 | 0 | 10 | 4,185 | 2.7 |
| 12 | Ethylphenyl trimethoxysilane | 24 | 40 | 0.2 | 10,200 | 6.4 |

Example 13

A copolymer was synthesized in the same manner as Example 1 except that the copolymer was synthesized by using more than two monomers.

3-Acryloxypropyltrimethoxysilane (0.16 mol) and phenyltrimethoxysilane (0.24 mol) were prepared as trialkoxy monomers. The trialkoxy monomers were added dropwise to an aqueous solution prepared as in Example 1 and then stirred. After the addition was completed, a gradual increase in molecular weight could be monitored with the progress of reaction, as shown in FIG. 2. The reaction was terminated when GPC revealed that the molecular weight did not increase any more, as in Example 1. This coincided with the time when a boundary between layers was clearly seen with eyes. $^1$H-NMR analysis of the resulting copolymer revealed that 3-acryloxypropyltrimethoxysilane (0.16 mol) and phenyltrimethoxysilane (0.24 mol) were polymerized at an accurate molar ratio of 6:4.

$M_w$=34,393 (based on polystyrene).
$^1$H-NMR (CDCl$_3$) δ (ppm)–0.8 to 1 (Si—CH$_2$), 1-1.8 (CH$_2$), 1.7-2 (=C—CH$_3$), 3-4.1 (O—CH$_2$), 5.1-5.4 (C=CH), 5.4-6.2 (C=CH), 6.7-8.0 (Si-Ph).
$^{29}$Si—NMR (CDCl$_3$) δ (ppm)–63 to –70 (CH$_2$—Si(O)$_{3/2}$), –78 to –82 (Ph-Si(O)$_{3/2}$).

Example 14

A copolymer was synthesized in the same manner as Example 11 except for using methyltrimethoxysilane instead of phenyltrimethoxysilane with the same amount. Molecular weight was analyzed by GPC. $^1$H-NMR analysis revealed that 3-acryloxypropyltrimethoxysilane (0.16 mol) and methyltrimethoxysilane (0.24 mol) were polymerized at a molar ratio of 6:4.

$M_w$=18,000 (based on polystyrene).
$^1$H-NMR (CDCl$_3$) δ (ppm) 0-0.2 (SiCH$_3$), 0.3-0.4 (Si—CH$_2$), 1.7-2 (CH$_2$), 1.9-2.1 (=C—CH$_3$), 4.0-4.2 (O—CH$_2$), 5.7-6.2 (d, C=CH).
$^{29}$Si—NMR (CDCl$_3$) δ (ppm)–63 to –73 (CH$_2$—Si(O)$_{3/2}$).

Example 15

Phenyltrimethoxysilane (0.4 mol) was prepared as a trialkoxy monomer and HPLC-grade tetrahydrofuran (40 g) and distilled water (24 g) were prepared as an aqueous mixture solvent. Potassium carbonate (0.2 g) was dissolved previously in distilled water as a catalyst and then mixed with tetrahydrofuran by homogeneously stirring for 20 minutes.

Phenyltrimethoxysilane (0.4 mol) was added dropwise to the resulting aqueous solution and then stirred. After the addition was completed and reaction was carried out for 76 hours, the reaction was terminated when GPC revealed that the degree of dispersity did not change over 10 hours, as shown in FIG. 2 (b). This coincided with the time when the increase of particles was not observed any more when seen with eyes. The resulting silsesquioxane may be purified simply by fractional distillation using a solvent which is immiscible with water and capable of dissolving silsesquioxane easily, e.g. chloroform, methylene chloride, toluene, xylene, etc.

The resulting silsesquioxane with a cage structure may be recrystallized to obtain pure silsesquioxane with a closed cage structure. The recrystallization was performed as follows. To a solution (200 g) prepared by mixing methylene chloride and ethanol at 9:1, the prepared phenylsilsesquioxane (20 g) with a cage structure was added, completely dissolved at 50° C. and then cooled to room temperature. MALDI-TOF MS analysis of the resulting silsesquioxane gave a single peak at 1570. This reveals that T12-POSS with 12 Si atoms was obtained.

$M_w$=2,300 (based on polystyrene).
$^1$H-NMR (CDCl$_3$) δ (ppm) 6.5-7.8 (Si-Ph, 6 peaks).
$^{29}$Si—NMR (CDCl$_3$) δ (ppm) –78 (CH$_2$—Si(O)$_{3/2}$).
MALDI-TOF mass=1570 (Na$^+$): phenyl-T12-POSS.

Example 16

Silsesquioxane was prepared in the same manner as Example 15, except for reducing the amount of water by 50% (to 12 g) and reducing the amount of the solvent to 40 g. Molecular weight was determined by GPC and MALDI-TOF MS. The result was the same as Example 15. Thus, it was confirmed from Examples 15 and 16 that when the amount of water in the aqueous solution is less than 50% of the alkoxy groups of if the amount of the solvent is more than that for the preparation of the silsesquioxane with a ladder structure by 10% or more, a cage structure is obtained rather than the ladder structure.

Comparative Example 1

When polymerization was performed by two-stage condensation or microwave radiation, the resulting polymer had a molecular weight ($M_w$) smaller than 10,000. In contrast, the polymerization using the aqueous mixture solution in Example 1 resulted in $M_w$=84,056 even at room temperature, as shown in FIG. 2.

Comparative Example 2

The existing silane sol-gel method or condensation at high temperature results in very low thermal stability because of inevitable defects (unreacted —OH or —OR (R=alkoxy)). In contrast, the $^{29}$Si—NMR spectra of FIG. 3 show clear T3 regions, not only for in the homopolymer but also in the copolymer of Example 13. When the amount of water and the solvent was adjusted as in Examples 15 and 16, the silsesquioxane with a completely closed cage structure could be prepared. A single peak was confirmed by $^{29}$Si—NMR analysis.

Comparative Example 3

The result of the $^{29}$Si—NMR analysis mentioned in Comparative Example 2 could be confirmed again through thermogravimetric analysis (TGA). FIG. 6 shows a TGA analysis result in consistent with the $^{29}$Si—NMR spectra. As a T3 structure close to 100% was attained through complete polymerization, no thermal loss was observed at 100 to 300° C., where thermal loss is frequently observed when there are defects (unreacted —OH or —OR(R=alkoxy)).

Comparative Example 4

Analysis of IR spectra shown in FIG. 5 confirmed again the increase of molecular weight and regular structure through increased Si—O—Si peaks. With the increase of the regular Si—O—Si moiety, one strong, broad peak at Si—O—Si split into two clear peaks. Whereas the silsesquioxane with a cage structure prepared in Examples 15 and 16 showed only one peak at 1000 to 1100 cm$^{-1}$ because it had only one Si—O—Si angle, the high-molecular-weight polysilsesquioxane with a ladder structure showed two distinct peaks because it had two Si—O—Si angles in the perpendicular and horizontal directions. Thus, it can be concluded that a silsesquioxane with a highly regular closed cage structure and a high-molecular-weight polysilsesquioxane with a ladder structure were synthesized respectively depending on the preparation conditions.

With the presently disclosed method, a polysilsesquioxane with a closed cage structure or a high-molecular-weight polysilsesquioxane with a ladder structure can be prepared as desired. The resulting polysilsesquioxanes may be variously utilized as functional materials.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

The invention claimed is:

1. A method for controlling a structure of a polysilsesquioxane prepared from a monomer represented by Chemical Formula 1, comprising:
   preparing an aqueous organic solution comprising the monomer represented by Chemical Formula 1, an organic solvent, water and a catalyst; and
   selectively preparing a polysilsesquioxane with a cage structure represented by Chemical Formula 2 or a polysilsesquioxane with a ladder structure represented by Chemical Formula 3 by adjusting the amount of the organic solvent or water in the aqueous organic solution, wherein the amount of the organic solvent is adjusted to 70 wt % or more or 30 wt % or less based on the entire aqueous solution and the molar ratio of R$_1$ : water is adjusted to smaller than 0.5 or larger than 10 based on the entire aqueous solution to prepare the polysilsesquioxane with a cage structure and
   wherein the amount of the organic solvent is adjusted to 31 to 69 wt % based on the entire aqueous solution and the molar ratio of R$_1$ : water is adjusted to 0.5 to 10 to prepare the polysilsesquioxane with a ladder structure:

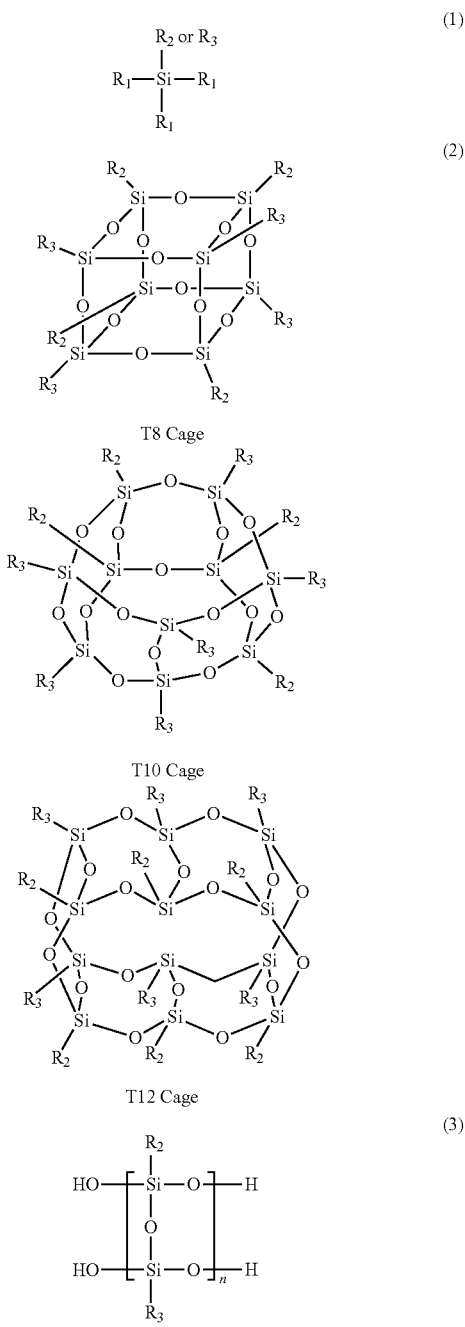

wherein
R$_1$ is C$_1$-C$_{20}$ alkoxy;
R$_2$ and R$_3$ are independently a substituted or unsubstituted aliphatic organic functional group or alkyl, aryl, vinyl, amine, acryl, halogen or alkylhalogen, wherein $R_2$ and $R_3$ may be the same or different; and n is from 2 to 100,000.

2. The method according to claim 1, wherein the catalyst included in the aqueous organic solution is an alkali catalyst.

3. The method according to claim 2, wherein the catalyst included in the aqueous organic solution is potassium carbonate ($K_2CO_3$).

4. The method according to claim 2, wherein the catalyst included in the aqueous organic solution is comprised at a concentration of 0.0001 to 50 mol % based on the molar concentration of $R_1$.

5. The method according to claim 1, which further comprises, after preparation of the aqueous organic solution, hydrolyzing the compound represented by Chemical Formula 1 to prepare an intermediate represented by Chemical Formula 4:

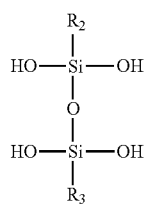

(4)

wherein $R_2$ and $R_3$ are the same as defined in claim 1.

6. The method according to claim 1, wherein the organic solvent is a polar solvent that can be mixed homogeneously with water.

7. The method according to claim 6, wherein the organic solvent is one or more selected from a group consisting of tetrahydrofuran (THF), dimethylformamide (DMF), acetonitrile, acetone, methyl ethyl ketone (MEK), methyl isobutyl ketone (MIBK), dimethyl sulfoxide (DMSO), dimethylacetamide (DMAc) and N-methylpyrrolidone (NMP).

8. The method according to claim 1, wherein the preparation of the polysilsesquioxane is performed at room temperature (15 ° C.) to 200 ° C.

9. The method according to claim 1, which further comprises, after selectively preparing the polysilsesquioxane with a cage structure represented by Chemical Formula 2 or the polysilsesquioxane with a ladder structure represented by Chemical Formula 3, purifying the polysilsesquioxane.

10. The method according to claim 9, wherein said purifying comprises:

distilling the organic solvent in the aqueous organic solution; and separating the polysilsesquioxane by treating with a solvent immiscible with water and capable of dissolving polysilsesquioxane.

* * * * *